United States Patent [19]

Williams

[11] Patent Number: 4,668,174
[45] Date of Patent: May 26, 1987

[54] APPARATUS FOR DIVIDING, ROUNDING, AND PANNING OF DOUGHBALLS

[75] Inventor: Luther Williams, London, Ky.

[73] Assignee: Kern's Bakeries, Inc., London, Ky.

[21] Appl. No.: 783,205

[22] Filed: Oct. 2, 1985

[51] Int. Cl.⁴ .............................................. A21C 9/08
[52] U.S. Cl. .................................... 425/145; 221/94; 425/238; 425/261; 425/333; 426/503
[58] Field of Search ............... 425/135, 145, 147, 161, 425/238, 240, 241, 253, 254, 256, 261, 332, 333, 294, 463; 221/94, 95, 101, 105, 109; 53/247, 495, 504; 426/503, 513

[56] References Cited

U.S. PATENT DOCUMENTS

| | | | |
|---|---|---|---|
| 2,670,888 | 3/1954 | Avila | 53/495 |
| 2,845,759 | 8/1958 | Cote et al. | 53/495 |
| 2,858,775 | 11/1958 | Marasso | 425/241 |
| 2,953,107 | 9/1960 | Marasso | 426/503 |
| 3,448,696 | 6/1969 | Verhoeven | 426/503 |
| 4,127,217 | 11/1978 | Hurst et al. | 221/94 |
| 4,177,030 | 12/1979 | Seiling | 426/503 |
| 4,395,427 | 7/1983 | Fisher et al. | 426/231 |

FOREIGN PATENT DOCUMENTS 2641211  3/1978  Fed. Rep. of Germany ...... 425/332

Primary Examiner—Jay H. Woo
Assistant Examiner—J. Fortenberry
Attorney, Agent, or Firm—Luedeka & Neely

[57] ABSTRACT

An apparatus for the dividing, rounding and panning of doughballs. The apparatus includes a divider and rounder for dividing and rounding four doughballs simultaneously and an infeed gate having a central section and two outer sections for controlling the dispensing of the doughballs from two inner and two outer dough chutes into an apparatus for panning. For smaller doughballs and pans which accommodate four doughballs in a row, the three-section gate is operable to function as a unitary gate to dispense the four doughballs from the chutes at the same time. For larger doughballs and pans which accommodate only two doughballs in a row, the method of the present invention includes the dividing and rounding of four doughballs and the dispensing of the doughballs from the chutes two at a time. This is accomplished in the apparatus by operating the divider at half-speed and by dispensing doughballs two at a time, alternately from the outer two chutes by opening the outer two sections of the infeed gate and from the inner two chutes by opening the central section of the infeed gate.

5 Claims, 12 Drawing Figures

APPARATUS FOR DIVIDING, ROUNDING, AND PANNING OF DOUGHBALLS

The present invention relates to commercial baking and more particularly relates to a method and apparatus for the dividing, rounding, and panning of doughballs.

In the commercial production of hamburger and hot dog buns, sandwich rolls, dinner rolls and other such small bread items, automated equipment is employed for forming doughballs and transferring the doughballs into pans for proofing and baking. Typically, such equipment employs a divider including a rotating cylinder containing four pistons which has the capacity to divide four units of dough in one cycle. The divided units from a cycle are rounded into doughballs and are dispensed into other equipment for further processing and panning.

During panning, the doughballs are transferred to pans which typically accommodate rows of doughballs. The panning process is continued with each pan until the rows of that pan are filled. In equipment of this type, the size of the doughballs may be changed by adjusting the stroke of the pistons of the divider. Thus, doughballs for larger items such as submarine sandwich buns are often produced with equipment which at other times is used for smaller items such as hambruger and hot dog buns.

With the smaller doughballs for hamburger and hot dog buns, the pans are typically designed to accommodate four doughballs and all four doughballs from a cycle of the divider form a row in the pan. For many of the larger items such as submarine sandwich buns, it is necessary to deliver only two doughballs at one time to the pan instead of the full output of four because the pans are designed to accommodate only two doughballs in each row. The panning of two doughballs per row has been accomplished by employing two "block-out" pistons in the divider head which render two of the pistons inoperable for the formation of doughballs and thus only two doughballs are produced per cycle. Generally, there are problems with the use of block-out pistons because of the lengthy shutdown required for the change-over and because operation with block-out pistons causes excessive wear on the divider head.

Alternately, it is possible to divide the full capacity of four doughballs and to divert two of the four doughballs out of the product flow before panning. The diverted dough is recycled by reloading it into the divider. This alternative, however, can result in overworking of the dough which may effect the quality of the product.

Accordingly, it is an object of the present invention to provide a method and apparatus for the dividing, rounding, and panning of doughballs. These and other objects of the present invention will become apparent when the specification is read in conjunction with the drawings in which.

Figure 1:
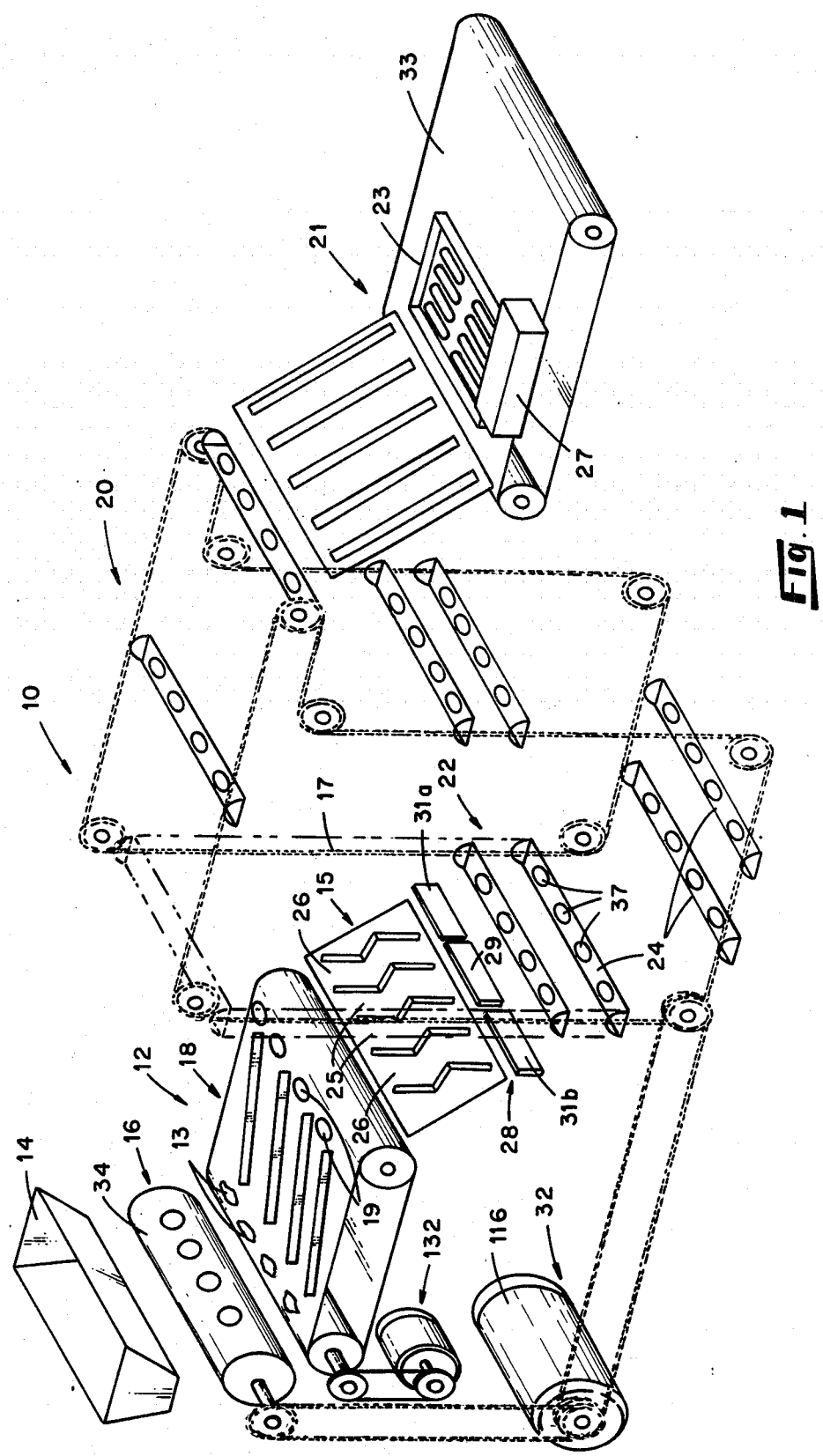
FIG. 1 is a diagrammatical view of an apparatus according to the present invention for the dividing, rounding, and panning of doughballs.

Generally, the present invention is a method and apparatus for continuously dividing and rounding dough into doughballs and transferring the doughballs to pans. The apparatus includes a divider head which divides four doughballs in a divider cycle and a rounder which rounds and substantially simultaneously transfers the four doughballs to two outer dough chutes and two inner dough chutes from which the doughballs are dispensed into pockets of moving trays to be carried to the pans.

The apparatus according to the present invention includes a three-section infeed gate for controlling the dispensing of the doughballs into the pockets of the trays. The infeed gate is divided into two outer sections which open and close to control the dispensing from the two outer chutes and a central section for opening and closing to control the dispensing from the inner two chutes. The infeed gate is actuated by an actuation mechanism which has a first and second operational mode, the first for smaller dough items where the pans receive four doughballs in each row and the second for larger items where only two doughballs are transferred into each row of a pan. The first operational mode of the actuation means is operable to maintain the two outer sections and the central section of the infeed gate in a closed condition to retain the four doughballs of a divider cycle until a tray is in a position to receive the doughballs and then to simultaneously open the two outer sections and the central section to dispense four doughballs into the tray. In the second mode, the actuation mechanism is operable to maintain the two outer sections and the central section in a closed condition to retain the four doughballs of a divider cycle until a first tray is in position to receive doughballs and then to open either the inner two chutes or the outer two chutes to dispense two of the doughballs of the divider cycle into the first tray. Then, the actuation mechanism causes the infeed gate to dispense the other two doughballs of a divider cycle into a second tray in position to receive doughballs by opening either the central section or the outer sections, whichever had not been opened to dispense doughballs into the first tray. The improved apparatus includes the capability for decreasing by one-half the normal speed of operation of the divider head in relation the movement of the trays so that in the second mode four doughballs are divided in each cycle and only two doughballs are dispensed into a moving tray.

The method of the present invention includes the dividing and rounding of four doughballs and conveying the four doughballs substantially simutlaneously to a dispensing station. The method further includes he dispensing of the doughballs two at a time from the dispensing station and conveying and transferring said two doughballs to pans. The process is repeated so that four doughballs are conveyed to the dispensing station when the four previous doughballs have been dispensed.

The apparatus of the present invention operates in a conventional manner for smaller bread items such as hamburger and hot dog buns where four doughballs are transferred to each row of a pan and is easily changed over for larger doughball operation such as submarine sandwich buns without the need for block-out pistons. The method and apparatus permit the full capacity of the divider to be utilized which decreases wear and tear on the equipment and eliminates downtime due to the disassembly of the divider head required to insert the block-out pistons.

Referring now to the drawings in which like reference characters designate like or similar features throughout the several views, there is shown diagrammatically in FIG. 1 an apparatus 10 for the dividing, rounding and panning of doughballs in which the present invention is embodied. The apparatus 10 includes a dividing and rounding unit designated generally by the numeral 12. The dividing and rounding unit 12 includes a divider head 16 with a hopper 14 for receiving and holding dough. Dough from the hopper 14 is repeatedly divided into four rough units 13 by the divider head 16.

The dividing and rounding unit 12 includes a rounder 18 for continuously receiving the four rough units 13 and for rounding the rough units 13 into doughballs 19. The four doughballs 19 are conveyed to a dispensing station 15 which dispenses the doughballs 19 into a panning unit 20. The dispensing station 15 includes two inner dough chutes 25 and two outer dough chutes 26 which extend from the rounder 18 and which receive doughballs from the rounder 18. The dispensing station 15 includes a three-section infeed gate 28 having a central section 29 and two outer sections 31a and 31b. The central section 29 is operable to open and close the inner two dough chutes 25 and the outer two sections 31a and 31b are operable to open and close the outer two dough chutes 26. As will be described in more detail hereinafter, the infeed gate 28 is operable in a first mode where the central section 29 and the outer sections 31a and 31b open and close in unison to dispense four doughballs and a second mode where the opening and closing of the central and outer sections is alternated to dispense doughballs two at a time into the panning unit 20. In operation in the second mode, the divider head 16 of the apparatus is operated at half-speed so that four doughballs are divided and all four are dispensed two at a time before four new doughballs reach the dispensing station 15.

The panning unit 20 receives doughballs and transfers the doughballs 19 to pans, with or without further processing such as molding depending on the requirements for the finished product. The panning unit 20 includes an elevator 22 having trays 24. Each tray 24 has four pockets 37 for receiving individual doughballs. The trays 24 of the elevator 22 are carried on continuous conveyor chains 17 and move upwardly past the dispensing station 15 to receive doughballs and the doughballs are carried in the trays 24 to a panning station 21. At the panning station 21, the doughballs are transferred to pans 23 carried on pan conveyer 33. The pan conveyer 33 includes an indexing mechanism 27 which advances the pans 23 so that doughballs 19 are transferred to the pans 23 in rows.

Figure 2:
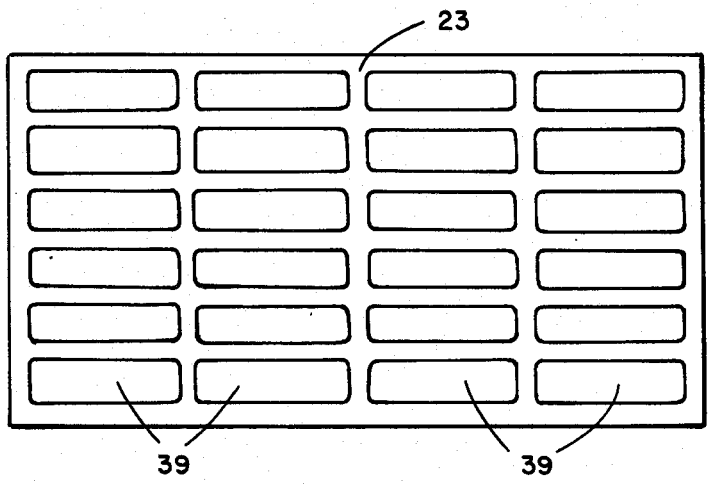
FIG. 2 is a plan view of a typical pan employed with the apparatus of the present invention for hot dog buns.
Figure 3:
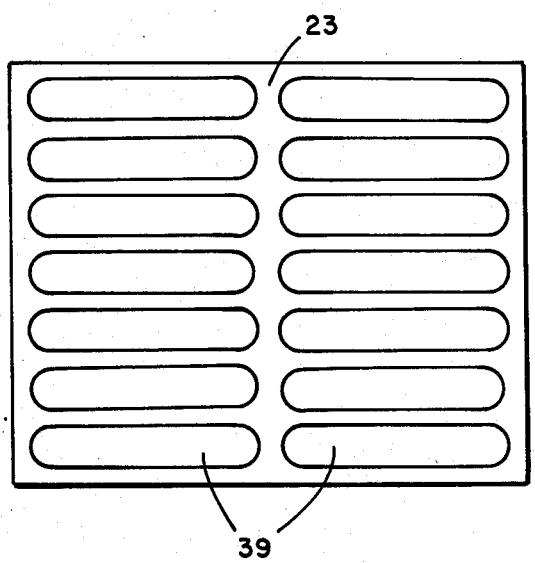
FIG. 3 is a plan view of a typical pan employed with apparatus of the present invention for submarine sandwich buns.

FIGS. 2 and 3 show typical pans into which doughballs 19 are transferred in the panning unit 20. FIG. 2 shows a pan 23 having four recesses 39 in a row for receiving doughballs such as would be employed in the production of hot dog buns. For such pans, three-section gate 28 of the dispensing station 15 is operated in the first mode to transfer doughballs into the panning unit 20 so that four doughballs 19 are transferred to each row of the pan 23.

FIG. 3 shows a pan 23 having two recesses 39 in a row such as would be employed in the production of submarine sandwich buns. For such pans, the three-section gate 28 is operated in the second mode to transfer two doughballs to the trays 24 of the elevator 22 of the panning unit 20 so that two doughballs 19 are transferred to each row of the pan 23.

For either of the pans depicted in FIGS. 2 and 3, the indexing mechanism indexes the pans 23 according to the positions of the recesses 39 so that doughballs are property transferred into the pans.

Figure 4:
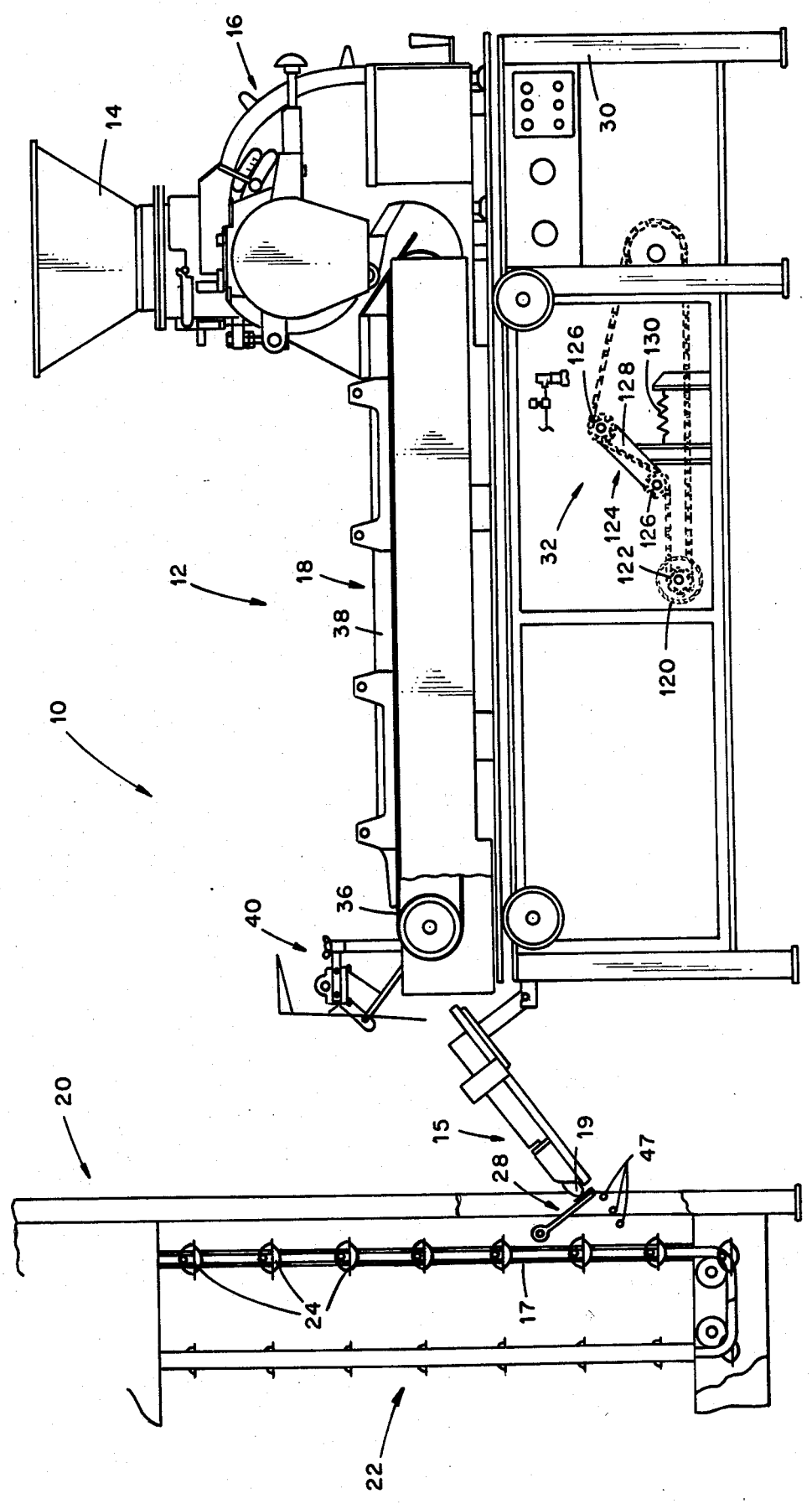
FIG. 4 is a partially broken-away elevational view of an apparatus embodying the present invention.
Figure 5:
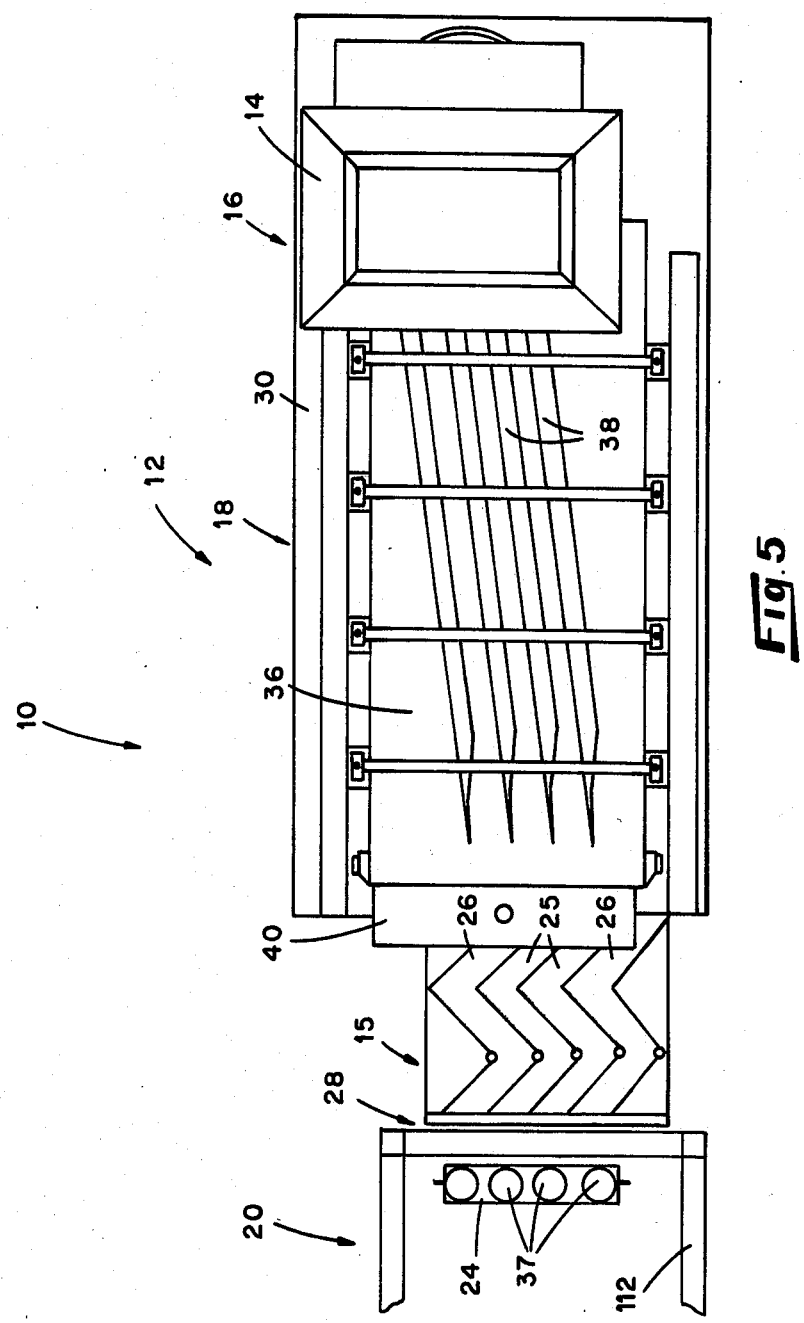
FIG. 5 is a partial top view of the apparatus of FIG. 4.

Referring now to FIGS. 4 and 5, a preferred embodiment of the present invention is shown including the dividing and rounding unit 12 and the elevator 22 of the panning unit 20. The dividing and rounding unit 12 of the type depicted is commercially available, for example, a unit manufactured by the Union Machinery Division of AMF in Richmond, Virginia which is sold as the "Model K-400 Roll Machine". In the dividing and rounding unit 12, a frame 30 with suitable upright members and crosspieces is used to support the divider head 16 and the rounder 18.

The divider head 16 utilizes a rotating cylidner 34 (shown diagrammatically in FIG. 1 and FIGS. 8-12) having four dough chambers and four pistons which are operable to divide units of dough by drawing dough into the chambers when the chambered area of the cylinder 34 is in contact with the dough in the hopper 14. When the rotating cylinder moves the chambered area away away from the hopper 14, units of dough are divided. The pistons expel rough units of dough into the rounder 18 as the chambered area cylinder 34 rotates towards the rounder 18.

The rounder 18 includes a moving continuous belt 36 which is driven so that the upper portion of the belt 36 moves away from the divider head 16 towards the panning unit 20. Four mould boards 38 are hung above and in contact with the upper surface of the continuous belt 36 at an angle oblique to the movement of the continuous belt 36. Rough dough units 13 transferred onto the belt 36 are carried on the belt 36 from the divider head 16 towards the chutes 26 and roll along the mould boards 38 to be rounded into generally spherical doughballs.

At the end of the dividing and rounding unit 12 remote from the divider head 16, is a flour sifter 40. The flour sifter 40 supplies a dusting of flour to the doughballs to reinforce the skin formed on the doughballs during the rounding process and to facilitating handling.

Figure 6:
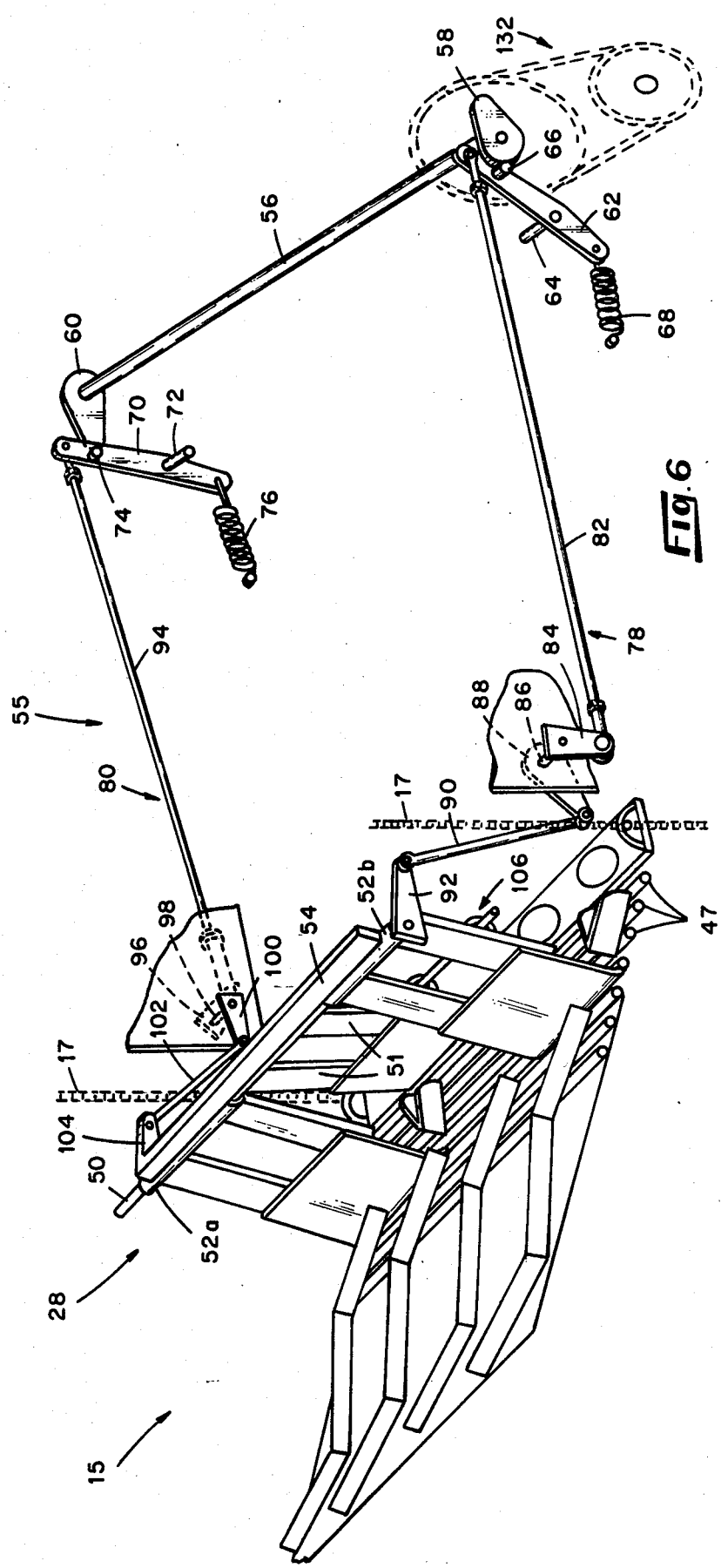
FIG. 6 is a somewhat diagrammatical perspective view of an infeed gate and actuation mechanism employed in the apparatus of FIG. 4.

In the preferred form of dispensing station as depicted in FIG. 6, the dough chutes 25 and 26 are preferably zig-zag dough chutes such as are available with dividing and rounding units such as the Model K-400 Roll Machine. The zig-zag dough chutes 25 and 26 are inclined at an angle to permit gravity to carry the doughballs 19 towards the panning unit 20. As shown, a plate 41 forms a floor for the chutes and five zig-zag dough guides 42 form the walls of the two inner chutes 25 and the two outer chutes 26. The lowest portion 43 of each of the dough guides 42 is pivotally mounted at its upper end on a post 44 and is movable on the post 44 to adjust the direction that the doughballs are dispensed into the trays 24 of the panning unit 20. The lower portions of the dough chute is formed by cross bars 47 which extend from the floor of the chutes provide a support surface for the doughballs 19 when they leave the chutes 25 and 26 and move into the panning unit 20. On the cross bars 47 past the infeed gate 28 are five doughball deflectors 45 which are generally aligned with the zig-zag guides 42. The doughball deflectors 45 are pivotally attached at their upper ends and are adjustable to direct doughballs into selected pockets of the trays 24.

Referring still to FIG. 6, the preferred form of the infeed gate 28 of the present invention is shown. The central section 29 of the infeed gate 28 is suitably provided by a plate of sufficient width to cover the openings from the inner dough chutes 25 and of sufficient height to prevent doughballs from rolling over the gate when closed. Similarly, the outer sections 31a and 31b are suitably provided by plates of sufficient width to cover the openings from the outer two chutes and of sufficient height to prevent doughballs from rolling over the gate when closed. Preferably, the lower edges of the plates forming both the central section 29 and the outer sections 31a and 31b are angled towards the panning unit 20 to prevent scraping of the skin on the top of a doughball when the sections are opened and doughballs roll beneath the gate.

The central section 29 of the infeed gate 28 is preferably supported from above for movement towards and away from the inner dough chutes 25 to open and close the central section 29. In the preferred embodiment depicted, this is accomplished by the use of a pivot shaft 50 which is suitably journalled for rotation above the openings of the chutes and is generally parallel to the floor of the chutes and the support surface provided by the cross bars 47. The central section 29 is suspended from the pivot shaft 50 preferably by two central section supports 51 which are attached to the shaft by welding or other such means and are attached to the side of the central section remote from the chutes 25 and 26. The central section 29 is thereby supported for pivotal motion on the pivot shaft 50 so that it can move to a closed position with the plate generally perpendicular to the floor of the chutes and the support surface formed by cross bars 47 and close to or in contact with the lowest portion 43 of the dough guides 42 and an open position where the gate is spaced-apart from the opening of the chute and sufficient space is provided between the lower edge of the central section 29 and the support surface formed by the cross bars 47 that doughballs roll beneath the central section 29 toward the panning unit 20.

The outer sections 31a and 31b are preferably also supported from above for movement towards and away from the outer dough chutes 26. In addition, the outer sections are linked so that they move in unison to open and close the outer dough chutes 26 at the same time. Preferably, this is accomplished by the use of two spacedapart sleeves 52a and 52b disposed for rotation about said pivot shaft 50. The outer sections 31a and 31b are preferably connected to the sleeves 52a and 52b by pairs of outer section supports 53a and 53b, respectively, which are welded or otherwise suitably attached to the sleeves 52a and 52b, respectively, and which are attached to the side of the outer sections 31a and 31b are thus suspended for pivotal motion by the sleeves 52a and 52b about the pivot shaft 50. A connecting bar 54 links the two sleeves 52a and 52b so that the outer sections 31a and 31b move in unison. The outer sections 31a and 31b are movable to a closed position with the plates generally perpendicular to the floor of the chutes and the support surface formed by the cross bars and close to or in contact with the lowest portion 43 of the dough guides 42 and an open position where the outer sections 31a and 31b are from the spaced-apart from the opening of the chute and sufficient space is provided between the lower edges of the outer sections 31a and 31b and the support surface formed by the cross bars 47 that doughballs roll beneath the outer sections 31a and 31b toward the panning unit 20.

The infeed gate 28 is operated by an actuation mechanism 55 which is operable in a first mode to open and close the central section 29 and the outer sections 31a and 31b in unison and a second mode where the central section 29 and the outer sections 31a and 31b are alternately open and closed. Referring to FIG. 6, the preferred form of the present invention employs a cam-driven actuation mechanism 55. The preferred mechanism includes a driven shaft 56 supported for rotation having a central section cam 58 and at one end and an outer section cam 60 at the other end. A central section rocker arm 62 is mounted at its central area on shaft 64 adjacent to the central section cam 58 and a central section cam follower 66 is provided on the arm 62 at its upper end to contact cam 58. The central section cam follower 66 is resiliently maintained in contact with the cam 58 by a spring 68 connected to the lower end of rocker arm 62. Similarly, an outer section rocker arm 70 is mounted at its central area on a shaft 72 adjacent the outer section cam 60 and an outer section cam follower 74 is provided on the arm 70 at its upper end to contact cam 60. The outer section cam follower 74 is resiliently maintained in contact with the cam 60 by a spring 76 connected to the lower end of the rocker arm 70.

The motion of the central section rocker arm 62 and the outer section rocker arm 70 is transmitted to the infeed gate 28 by central section linkage and outer section linkage 78 and 80, respectively. The central section linkage 78 includes a rod 82 extending between and being pivotally connected to the upper end of rocker arm 62 and a pivot arm 84. Pivot arm 84 is connected to and extends downwards from a journalled shaft 86. Journalled shaft 86 is connected to arm 88 which extends towards the chutes 25 and 26. Connector rod 90 is pivotally connected to arm 88 and extends upwardly to be pivotally connected to a pivot shaft arm 92. Pivot shaft arm 92 is attached to the pivot shaft 50 and extends generally away from the dough chutes 25 and 26. Linkage 78 is thus capable of opening the central section 29 of the infeed gate 28 when the central section cam 58 acts on cam follower 66 to rock rocker arm 62.

Similarly, outer section linkage 80 includes rod 94 extending between and being pivotally connected to the upper end of rocker arm 70 and a pivot arm 96. Pivot arm 96 is connected to and extends downwardly from a journalled shaft 98. Journalled shaft 98 is connected to an arm 100 which extends toward the chutes 25 and 26. Connector rod 102 is pivotally connected to arm 100 and extends upwardly to and is pivotally connected to an outer section connector arm 104. Outer section pivot arm is attached to connecting bar 54 and extends away from the dough chutes 25 and 26. Linkage 80 to is thus capable of opening the outer sections 31a and 31b of the infeed gate 28 when the outer section cam 60 acts on cam follwoer 74 to rock rocker arm 70.

Figure 7:
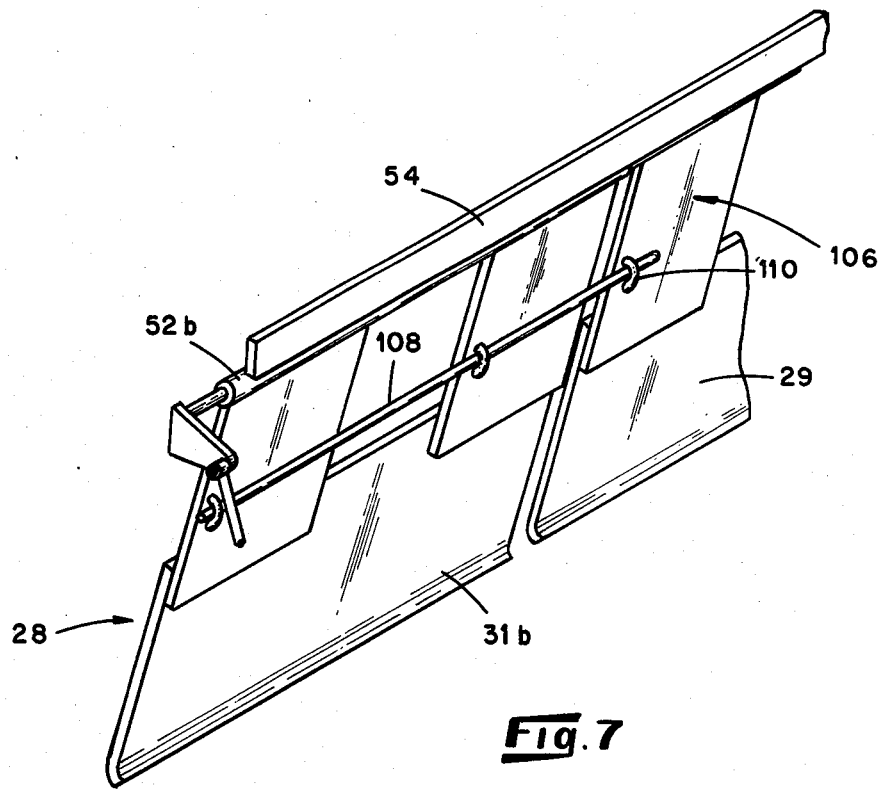
FIG. 7 is an enlarged view of a portion of the infeed gate and actuation mechanism of FIG. 6.

Referring to FIG. 7, the infeed gate 28 includes a locking mechanism 106 which is operable to cause the central section 29 and the outer sections 31a and 31b to selectively move in unison. A suitable locking mechanism 106 includes a pin 108 slidably mounted on the side of the outer section 31a remote from the dough chutes 25 and 26. The pin 108 is operable to link the outer section 31a to the central section 29 by sliding into an eye 110 on the side of the central section remote from the chutes 25 and 26. With the pin 110 inserted in eye 110, the gate is operable to function as a unitary gate since the outer section 31a is connected to the central section 29 and the other outer section 31b is connected to outer section 31a. When so connected, the actuation mechanism 55 operates the gate 28 as a unitary gate with both the central section cam 58 and the outer section cam 60 acting to open and close the central and the outer sections gate 28 simultaneously.

The cams 58 and 60 of the actuation mechanism 55 operate the linkages 78 and 80 with generally equal timing between alternate operations. In the preferred form of the invention depicted in FIG. 6 with similar rocker arms 62 and 70 and similarly linkages to the gate sections, this is accomplished by having the angular spacing of the lobes of the cams on the driven shaft 56 being approximately 180°.

A preferred form of the panning unit 20 is partially shown in FIGS. 4 and 5. The panning unit 20 includes a frame 112 of suitably interconnected uprights and crosspieces. The frame 112 supports the elevator 22 adjacent to the dispensing station 15 so that doughballs dispensed from the chutes 25 and 26 of the dispensing station 15 are deposited into the trays 24 of the elevator. A panning unit of this type is the unit sold as the "Pan-O-Mat, Model 410" by the Union machinery Division of AMF in Richmond, Virginia. In this panning unit, the trays 24 of the elevator have four pockets 114 for receiving doughballs. In the preferred unit such as the Pan-O-Mat, the doughballs are conveyed in the pockets 14 of the trays 24 and are transferred to the pans 23 in the same arrangement as depsoited in the trays 24.

Referring to FIG. 1, the apparatus 10 is driven by the operation of the dividing and rounding unit 12 is coordinated with the operation of the elevator 22 of the panning unit 20 by a drive mechanism 113 which drives both the divider head 16 and the elevator 22. As shown diagrammatically in FIG. 1, a motor and gear box 116 is connected to the divider head 16 and to the panning unit 20. The drive mechanism 113 is operable to move the trays 24 of the elevator 22 so that they move upwardly into position to receive doughballs as they are dispensed from the dispensing station 15. In addition, the drive mechanism 113 is capable in the second operational mode of operating the divider 12 at one-half its normal speed, so that four doughballs are divided in a cycle and these are dispensed only two at a time from the dispensing station 15.

As shown in FIG. 4 in the preferred form of the present invention, operation of the divider head at half-speed is accomplished with a drive mechanism 32 which forms a part of the drive mechanism 113. Drive mechanism 32 includes a roller chain 118, large drive sprocket 120 and small drive sprocket 122 which has half the number of teeth as the large drive sprocket 120. Operation of the divider at half-speed is selectively accomplished by shifting roller chain 118 from large drive sprocket 120 to small drive sprocket 122. Preferably, shifting is facilitated by the use of a roller chain 118 with sufficient slack to enable shifting of the chain 118 from the large sprocket 120 to the small sprocket 122 and a chain tensioner 124 including idler sprockets 126 on pivot arm 128 in an over and under arrangement. Spring 130 maintains tension on pivot arm 128 to take up the slack in roller chain 118 and enables easy shifting of the chain 118 from the large sprocket 120 to the small sprockets 122.

The actuation mechanism 55 for the infeed gate 28 is also preferably driven by motor and gear box 116 so that the operation of the infeed gate 28 is coordinated with the operation of the divider head 16 and the elevator 22. The driven shaft 56 of the actuation mechanism 55 is rotated by chain drive 132 which is conveniently connected to the drive for the elevator 22 as is shown diagrammatically in FIG. 1. In the preferred form of the actuation mechanism depicted in FIG. 6, the chain drive 132 is operable to turn the driven shaft 56 once for two cycles of the divider head 16 in the first operational mode and once for each cycle of the divider head 16 in the second operational mode.

The rounder 18 of the dividing and rounding unit 12 is driven by a separate rounder drive 134. The speed of the rounder drive 132 is continuously adjustable to alter the speed of movement of the doughballs 19 from a divider cycle through the rounder 18. Consequently, it is possible to adjust the movement of the doughballs so that they reach dispensing station 15 when the infeed gate 28 is in a closed condition.

Figure 8:
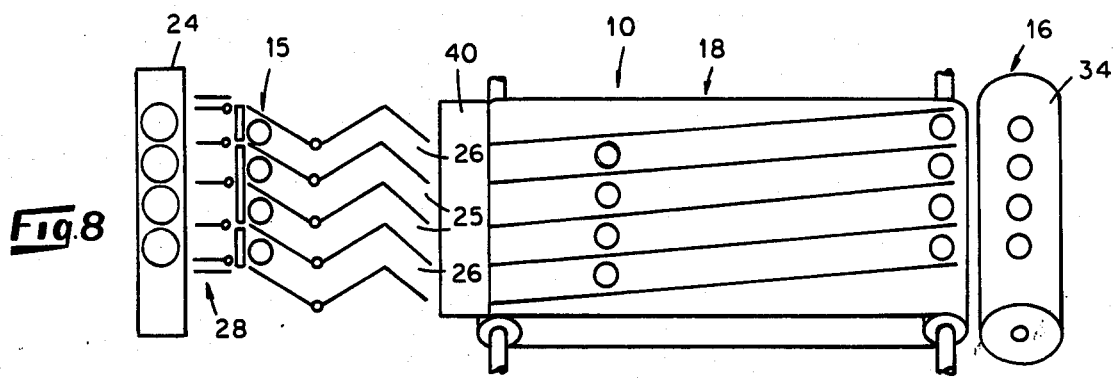
FIGS. 8 and 9 are diagrammatical views of the apparatus of FIG. 4 in a first operational mode.
Figure 9:
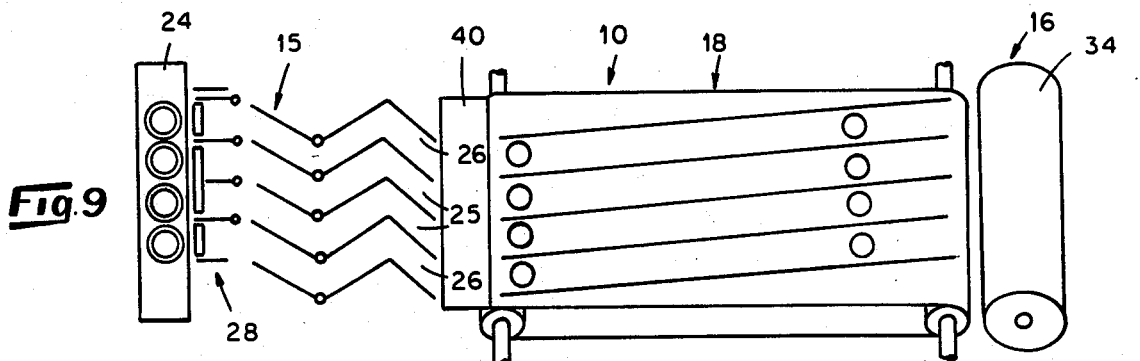

FIGS. 8 and 9 illustrate the the apparatus 10 in the first operational mode. To use the apparatus 10 in this mode, it is necessary to utilize the large drive sprocket 120 of the shifting mechanism 132 and insert the pin 108 of the locking mechanism 106 into eye 110 so that the gate 28 operates as a unitary gate. In addition, it is necessary to adjust the lowest portions 43 of the zig-zag guides 42 and the doughball deflectors 45 as shown in FIGS. 8 and 9 so that the four doughballs are dispensed into all four pockets 37 of a tray 24 of the elevator 22.

In operation, the divider head 16 divides four rough dough units 13 which are deposited into the rounder 18. The rounder 18 rounds the rough dough units into doughballs which are conveyed through the flour sifter 40 and into the dough chutes 25 and 26 of the dispensing station 15. This is shown diagrammatically in FIG. 8 where four doughballs are shown to be retained in the dough chutes by the infeed gate 28 and a tray 24 of the elevator is moved into position to receive the doughballs 19. As shown in FIG. 9, the infeed gate 28 is opened with the central section 29 and the outer sections 31a and 31b opening simultaneously and four doughballs are dispensed into the pockets of the tray 24. The panning unit 20 conveys the four doughballs to the panning station 21 where the four doughballs are transferred into a pan 23 such as is shown in FIG. 2 with four doughballs 19 forming one row.

Figure 10:
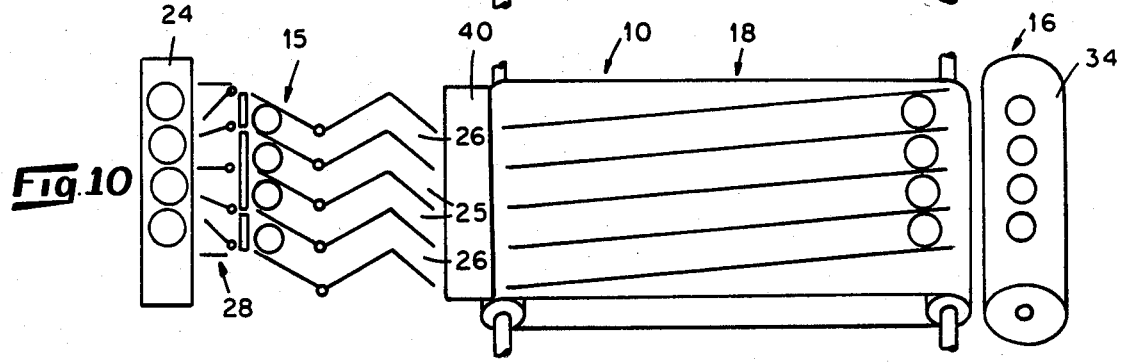
FIGS. 10 through 12 are diagrammatical views of the apparatus of FIG. 4 in a second operational mode.
Figure 11:
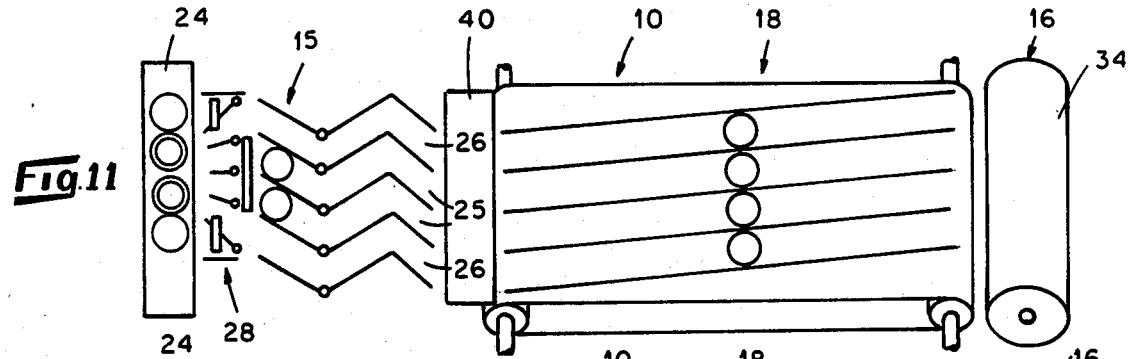
Figure 12:
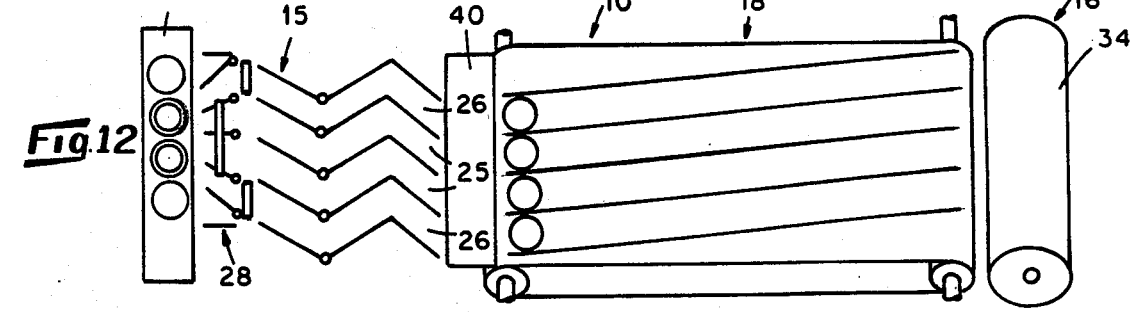

In the second mode and in accordance with the method of present invention, FIGS. 10, 11 and 12 illustrate the operation of the apparatus 10. In the second mode, it is necessary to utilize the small drive sprocket 122 of the drive mechanism 32 to operate the divider head at half-speed and to release the locking mechanism 106 so that the central section 29 and the outer sections 31a and 31b operate independently. In addition, it is necessary to adjust the lowest portions 43 of the zig-zag guides 42 and to adjust the doughball reflectors 45 as shown in FIGS. 10-12 so that doughballs dispensed from either the inner two chutes 25 or the outer two chutes 26 are directed into the two pockets 37 of a tray 24 of the elevator 22. preferably, the inner two pockets of the four pockets.

In operation as shown in FIG. 10, four doughballs 19 have been divided and have been rounded and are retained in the dough chutes 25 and 26 by the infeed gate 28. When a first tray is in position to receive doughballs, the outer two chutes open such as is shown in FIGS. 11 and the doughballs from the outer two chutes are dispensed into the inner two pockets of the tray 24. The doughballs in the inner two pockets of the tray 24 are conveyed to the panning station 21 and the two doughballs form a row of doughballs in a pan 23 such as is illustrated in FIG. 3. When a second tray has moved in position, the central section 29 of the infeed gate is opened and the two remaining doughballs in the inner two dough chutes are dispensed into the inner two pockets of the tray 24. Again, these two doughballs are conveyed to the panning station 21 and are transferred to a pan such as is shown in FIG. 3. When the four doughballs from one divider cycle have been dispensed two at a time, four additional doughballs from the rounder 18 are retained by the infeed gate such as is shown in FIG. 10. The process as described is then repeated.

In the operation of the preferred form of the invention in the second operation mode, either the central section 29 or the outer sections 31a or 31b can be opened first to dispense doughballs into the first tray which moves into position to receive doughballs. This is possible since both the central section 29 and the outer sections 31a and 31b are closed between the alternate opening of the central section 29 and the outer sections 31a and 31b and the timing of the alternate opening and closing is generally equivalent.

The apparatus of the present invention when operated in the first operational mode for the dividing, rounding, and transferring four doughballs to a row in a pan operates similarly to conventional equipment. For the production of larger items to be transferred to pans with two doughballs in a row, the method and apparatus of the present invention utilize the full capacity of the divider by dividing four doughballs in a cycle and then transferring them two at a time to the elevator so that two doughballs are transferred to each row of a pan.

The apparatus of the present invention eliminates the need for block-out pistons in the divider head and the resultant wear associated with the use block-out pistons Moreover, the apparatus of the present invention is easily changed over from the first mode to the second mode without any dismantling of the divider head as is necessary to install block-out pistons. All that is required is the shifting of the roller chain 118 from the large sprocket 120 to the small sprocket 122 and the appropriate adjustment of the zig-zag guides 42 and the doughball deflectors 45. The infeed gate 28 is easily changed over from the unitary gate for use in the first operational mode to the second operational mode by simply releasing the pin 108 from the eye 110.

The apparatus of the present invention is easily constructed from known components such as the Model K-400 Roll Machine and the Pan-O-Mat Model 410. To utilize these components, it is necessary to add the infeed gate 28 according to the present invention and to add the smaller drive sprocket 122 in order to decrease the speed of the divider head 16 by one-half. Existing cam and linkage on the Pan-O-Mat Model 410 may be employed for either the central section cam and linkage or the outer section cam and linkage. Since the central section cam 58 and the outer section cam 60 are both utilized to operate the infeed gate 28 in the first operational mode, the existing driven shaft may be utilized in the actuation mechanism 55 of the present invention but it must be driven at half the speed of the shaft provided in the commercially available Pan-O-Mat 410.

Because the actuation mechanism 55 of the present invention utilizes the central section cam 58 and the outer section cam 60 in both the first and second operational modes, the actuation mechanism 55 is relatively simple and provides efficient operation.

While a preferred embodiment of the present invention has been shown and described, it will be understood that there is no intent to limit the invention by such disclosure but rather, it is intended to cover all modifications and alternate embodiments falling within the spirit and scope of the invention as defined in the appended claims.

What is claimed is:

1. In an apparatus for continuously dividing and rounding dough into doughballs and transferring the doughballs to pans, said apparatus having a divider head which divides four doughballs in a divider cycle and rounds and substantially simultaneously transfers the four doughballs to two outer dough chutes and two inner dough chutes from which the doughballs are dispensed into pockets of moving trays to be carried to the pans, the movement of the trays being synchronized with the operation of the divider, the improvement comprising:

infeed gate means for controlling the dispensing of the doughballs from the dough chutes into the pockets of the trays, said infeed gate means having two outer sections for opening and closing to control the dispensing from the two outer chutes and a central section for opening and closing to control the dispensing from the inner two chutes;

actuation means for actuating said infeed gate means having first and second operational modes, said first mode being operable to maintain the two outer sections and the central section of the infeed gate in a closed condition to retain the four doughballs of a divider cycle until a tray is in position to receive the doughballs and then to open the two outer sections and the central section to dispense four doughballs into the tray, said second mode being operable to maintain the two outer sections and the central section in a closed condition to retain the four doughballs of a divider cycle until a first tray is in position to receive doughballs and then to open the inner two chutes to dispense two of the doughballs of a divider cycle into said first tray and then to open the outer two chutes to dispense the other two doughballs of a divider cycle into a second tray in position to receive doughballs; and means for decreasing by one-half the speed of operation of the divider head in relation to the movement of the trays when the actuation means is in the second mode.

2. The apparatus of claim 1 wherein said actuation means is operable in said second mode to dispense doughballs from the outer two chutes into a first tray and then to dispense doughballs from the inner two chutes into a second tray.

3. The apparatus of claims 1 or 2 wherein said actuation means comprises a cam mechanism synchronized with the movement of the trays, said cam mechanism having an outer section cam and cam follower and a central section cam and cam follower, said outer section cam and cam follower being operable in said second mode to open and close said outer infeed gate sections, said central section cam and cam follower being operable in said second mode for opening and closing said central infeed gate section, said cam mechanism being operable in said first mode for opening and closing said outer section and said central section of said infeed gate means in unison.

4. The apparatus of claim 3 further comprising linkage between at least one of said outer infeed gate sections and said central infeed gate sections which is selectively operable to link said gate sections for operation in the first mode so that said outer section cam and cam follower and said central section cam and cam follower open and close said central and outer gate sections in unison.

5. The apparatus of claim 4 wherein said central section of said infeed gate means is pivotally supported on a shaft which is rotated by said central section cam and cam follower to open and close said central section and said outer sections of said infeed gate means are pivotally supported on spaced-apart sleeves mounted about said shaft, said sleeves being mecahnically linked and being rotated by said outer section cam and cam follower to open and close said outer sections of said infeed gate.

* * * * *